May 19, 1959     J. D. YALE     2,887,006
VISUAL TRAINING PROJECTOR
Filed Aug. 13, 1956     2 Sheets-Sheet 1
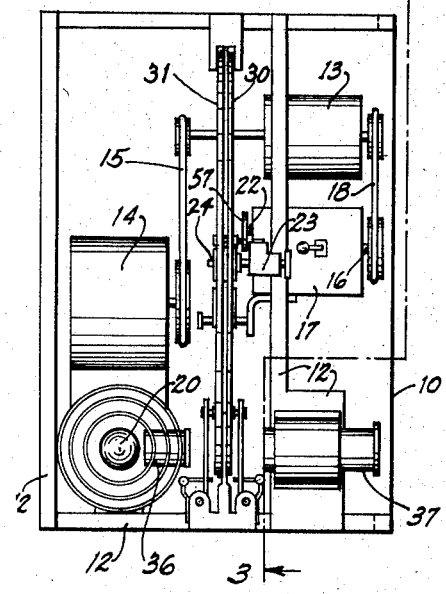
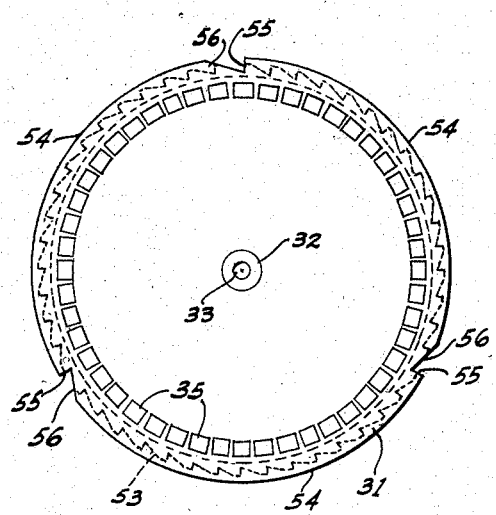
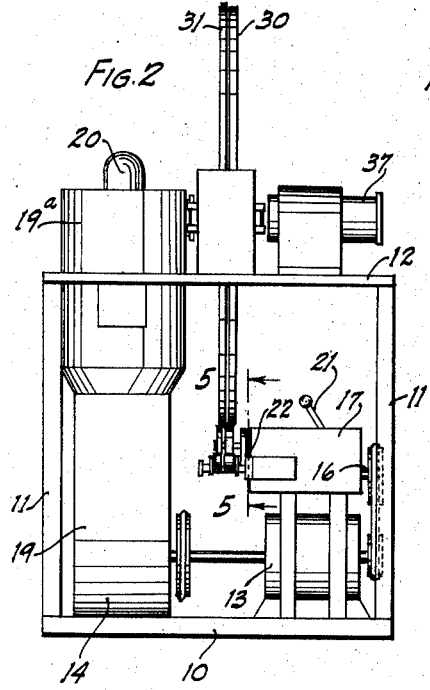
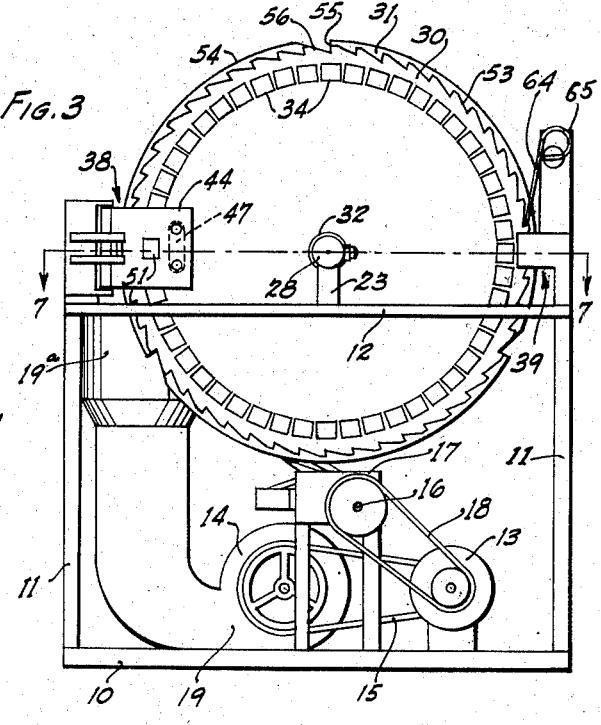
INVENTOR
JAMES D. YALE
BY Charles E. Markham
HIS AGENT May 19, 1959  J. D. YALE  2,887,006
VISUAL TRAINING PROJECTOR
Filed Aug. 13, 1956  2 Sheets-Sheet 2
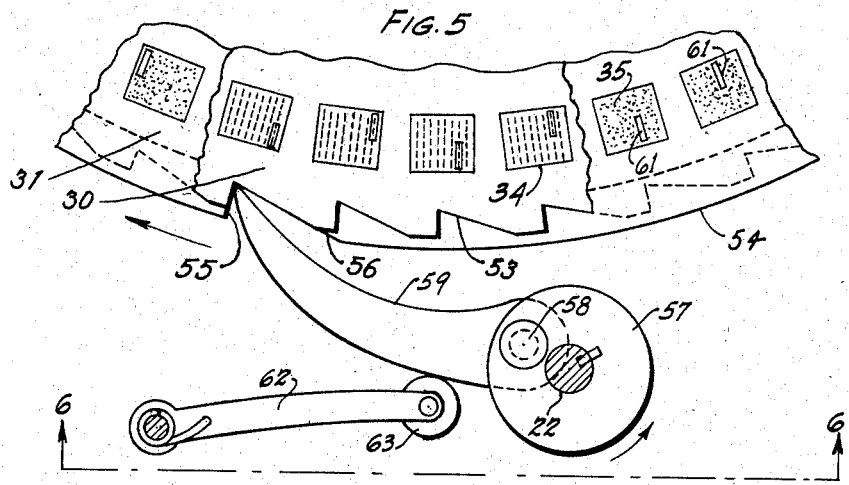
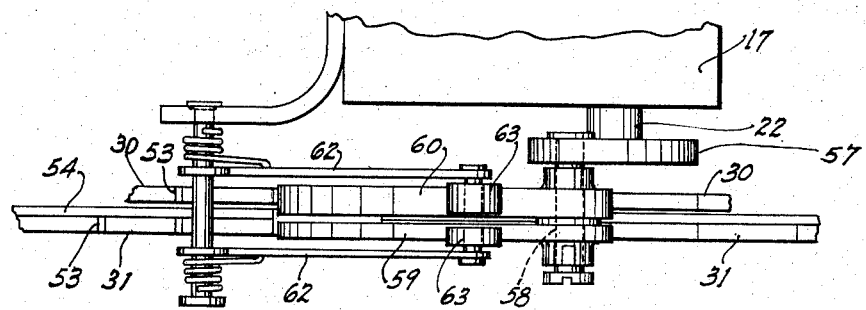
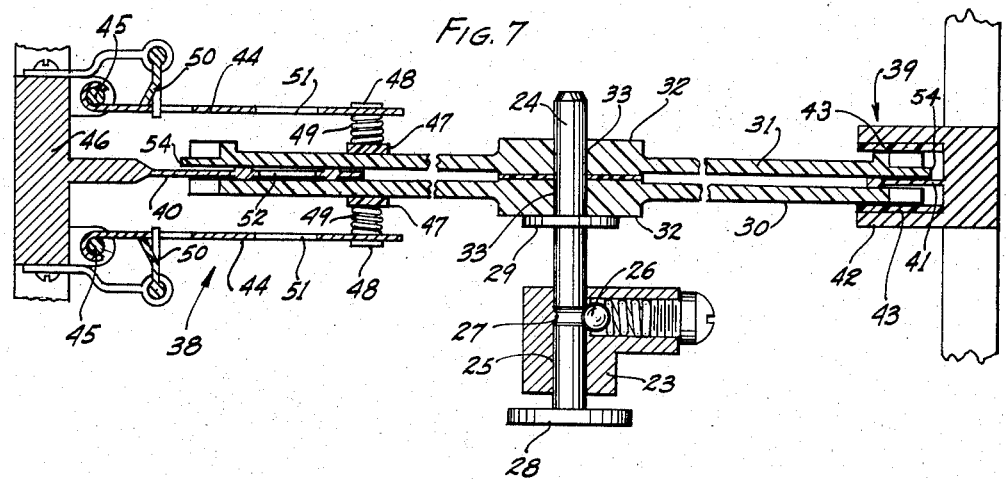
INVENTOR
JAMES D. YALE
BY Charles E. Markham
HIS AGENT

United States Patent Office 2,887,006
Patented May 19, 1959

2,887,006

VISUAL TRAINING PROJECTOR

James D. Yale, St. Louis, Mo., assignor, by mesne assignments, to White-Rodgers Company, a corporation of Delaware Application August 13, 1956, Serial No. 603,696

3 Claims. (Cl. 88—27)

This invention relates to a device for training the eyes to successively fix with increasing accuracy and rapidity upon sequential portions of a text without regression.

An object of the invention is to provide a particularly simple, dependable, and low cost reading training projector which because of its simplicity requires a minimum of technical skill to operate and maintain and is, therefore, admirably suited for reading training at the elementary school level.

A further object is the provision of a generally new and improved reading training projector arranged to successively feed for projection sequential frames of intelligible matter which are photographed on or mounted on relatively rigid strips or circular discs instead of being photographed on conventional, thin, flexible film.

A further object is the provision of a novel and simplified intermittent feed mechanism for a reading training projector.

These and other objects and advantages, which appear from the following description when read in connection with the accompanying drawings, constitute the present invention.

In the drawings:

Fig. 1 is a top plan view of a reading training projector built in accordance with the present invention;

Fig. 2 is an end elevational view of the device shown in Fig. 1;

Fig. 3 is a front elevational view of the device shown in Fig. 1 with the projection lens removed and is taken along line 3—3 of Fig. 1;

Fig. 4 is a front side view of one form of fixation disc employed in the device;

Fig. 5 is an enlarged fragmentary detail view of the feeding mechanism and is taken on line 5—5 of Fig. 2;

Fig. 6 is a bottom plan view of the feed mechanism shown in Fig. 5 and is taken along line 6—6 of Fig. 5; and Fig. 7 is a sectional view taken on line 7—7 of Fig. 3.

The device is supported in an open, rigid frame consisting of a lower base member 10, vertical members 11, and top horizontal members 12. Mounted on base member 10 is a driving motor 13 which drives a blower 14 through a belt 15 and also drives the input shaft 16 of a speed changing unit 17 through a belt 18. The blower includes a volute housing 19 having an upwardly extending outlet 19a in the open end of which is mounted a projection lamp 20. The speed change unit 17 includes a manual speed change handle 21 and an output shaft 22.

Centrally mounted on a top horizontal frame member 12 is a pedestal 23 which carries a mounting shaft 24. Shaft 24 is slidably fitted in a bore 25 in pedestal 23 and a spring-pressed detent ball 26 enters a groove 27 in shaft 24 to releasably hold the shaft against longitudinal movement, see Fig. 7. Shaft 24 is provided with a hand knob 28 at one end and an intermediate flange portion 29.

A pair of discs 30 and 31, each having a hub portion 32 and a central perforation 33, are shown mounted on shaft 24 with one face of the hub 32 on disc 30 bearing against the flange 29 on shaft 24. Preferably, the discs 30 and 31 are constructed of a transparent synthetic plastic material of the desired rigidity, with an annular band of photographic emulsion on one side of each disc so that a series of frames of text 34, see Fig. 6, may be photographed on the disc 30, which will be referred to hereinafter as the text disc, and so that a series of frames 35, each having transparent and opaque areas for a purpose to be described, may be photographed on disc 31, which will be referred to hereinafter as the fixation disc.

A condensing lens system 36, between the lamp 20 and the discs, and a projection lens system 37, supported on a horizontal member 12 forward of the discs, are provided. The discs 30 and 31 are guided and maintained in definite spaced relationship at diametrically opposite points. On the left, referring to Figs. 3 and 7, the discs are guided by a pair of hinged gates generally indicated at 38, and on the right by a fixed guide generally indicated at 39. Spacing bars indicated at 40 in the gate assembly and at 41 in the fixed guide maintain a definite spacing of the discs. The fixed guide 39 comprises a channeled member 42 bisected by the integral spacing bar 41. The dimensions of the guide channel and spacing bar are such that the discs slide freely therethrough, and the channel walls are preferably lined with a suitable, synthetic, plastic wearing surface 43.

The hinged gate assembly 38 further includes a pair of gates 44 hinged on pins 45 carried by a support member 46. Each of the gates carries thereon a pressure plate 47 which is slidably mounted on a pin 48 and is biased outwardly from the supporting gate by a spring 49 so as to exert a predetermined drag on the disc when the gate is closed. The gates are held in a closed position by releasable latch members 50. The gates 44 and the spacing bar 40 are provided with projection apertures 51 and 52, respectively, in alignment with the optical axis of the condensing and projecting lens systems. The photographic emulsion is on the inside or adjacent sides of the discs, so that space between the photographic frames on the two discs is at a minimum.

The discs 30 and 31 are both provided with peripheral teeth 53, the number of teeth on each being equal to the number of photographic frames. The fixation disc 31 is additionally provided with a cam ring lying alongside of the teeth 53 and having peripheral surfaces lying radially outward of the teeth 53. The cam ring comprises three peripheral cam surfaces 54, each having an extensive concentric dwell surface which terminates at one end with an abrupt radial surface 55 and at its other end with an inclined surface 56. The surfaces 55 and 56 coincide with the surfaces of adjacent teeth 53, see Figs. 4 and 5.

Attached to the end of the output shaft 22 of the speed change unit 17, as by keying, is a driving wheel 57 which carries an eccentrically mounted pin 58. Mounted for free rotation on eccentric pin 58 is a driving pawl 59 which has a free outer end for engaging the teeth 53 of fixation disc 31. As the driving wheel 57 rotates, the disc 31 is driven one tooth, or one frame, during one-half of a revolution of the driving wheel, and the pawl is returned to engage the next tooth during the other half of the revolution. It will be seen that the motion imparted to the disc by the pawl through each feeding stroke is one of gradual acceleration and deceleration, thereby providing a very smooth, intermittent feeding of the photographic frames through the projection aperture and thereby minimizing any tendency to overshoot at high feeding rates.

Referring to Fig. 6, it will be seen that pawl 59 is arranged to overlie and engage teeth 53 on fixation disc 31 only, and that a second similar pawl 60, being somewhat thicker than pawl 59, spans the teeth 53 on the adjacent text disc 30 and also spans the cam portion 54 of fixation disc 31. Pawl 60 is thereby prevented from entering the teeth 53 on text disc 30 except when it coincides with one of three tooth-conforming notches formed by surfaces 55 and 56 in the cam ring. Thus, as driving wheel 57 rotates, the fixation disc 31 is continuously fed one frame for each revolution, and the text disc 30 will be fed one frame each time the pawl 60 drops into one of the tooth-conforming notches in the cam ring on the fixation disc 31.

While any number of combinations may obviously be employed, the present embodiment illustrates a combination in which there are forty-eight frames on each of the discs, with eight lines of text per frame 34 on the text disc 30 and one fixation or transparent window 61 per frame 35 on the fixation disc 31, see Figs. 3, 4, and 5. The windows 61 are arranged on successive frames 35 so that each will successively expose one half line of text as the fixation disc is fed frame by frame relative to the text disc. With this combination, the text disc will remain motionless with the same frame in the projection aperture while the fixation disc is fed through sixteen frames, then the text disc is fed one frame simultaneously with a frame of the fixation disc. If it is desired to provide three fixations per line, a fixation disc also having forty-eight frames, but only two cam notches and a series of three windows 61 per line, is substituted. Whatever combination is chosen, the windows 61 are arranged so as to progressively expose sequential portions of a line of text, and also from line to line down the frame as the fixation disc is fed frame by frame relative to a motionless frame of text.

The pawls 59 and 60 are independently pivoted and are held resiliently in contact with the peripheries of the discs by spring-pressed arms 62 carrying rollers 63 at their free ends, which rollers ride against the lower surfaces of the pawls. In order to insure against any possible slight reversal of either of the discs during the return stroke of the pawls, a lightly biased detent 64 mounted on a support member 65 may be provided.

In operation when it is desired to load the projector with text and fixation discs, the gate latches 50 are swung out and the gates 44 opened. The disc mounting shaft 24 is pulled inward by the knob 28 until flange 29 rests against the pedestal 23. The discs are now slipped downward on opposite sides of the spacing guide bars 40 and 41 and are held in position while pushing the mounting shaft 24 outward through the disc apertures until it snaps in position with ball 26 in groove 27. The gates 44 are then closed and latched.

The text disc 30 is now rotated clockwise manually so as to position the first frame of the text one or two frames counterclockwise of the projection aperture. The driving motor and lamp are now energized. Regardless of the relative angular positions of the fixation and text discs at this time, they will automatically come into registry upon the occurrence of the next succeeding cam notch. The rate of feeding may be controlled by manual adjustment of the speed change unit 17.

It is to be understood that the fixation disc 31 need not be a transparent disc with photographic frames thereon. If desired, the fixation disc may be made of an entirely opaque or semi-opaque material, suitably rigid for the purpose, with punched windows. It is also to be understood that rigid transparent strips may be used in lieu of discs on which successive frames of intelligible matter are photographed, and with teeth 53 and cam surfaces 54 formed along one edge thereof. The guides would in this case be arranged to guide the strips for horizontal or vertical movement. The property "rigid," as applied to such discs or strips in the foregoing description and appended claims, is intended to distinguish from conventional, thin, photographic film strips which obviously are too flexible to be driven by pawls engaging peripheral or edge teeth therein. It will also be apparent that a single disc or strip may be used in the device for the full projection of successive frames of photographed matter at variable rates.

The foregoing description is intended to be illustrative and not limiting, the scope of the invention being set forth in the appended claims.

I claim:

1. In a reading training projector, lamp and lens means, a mounting shaft, a pair of circular disc members centrally supported side by side for rotation on said shaft, one of said discs having an annularly arranged series of photographic frames of text matter thereon arranged to be successively positioned for projection by said lamp and lens means as said disc is rotated, the other of said discs being opaque but having an annularly arranged series of uniform transparent windows therein overlaying said series of frames on said first disc, and said windows each being of such size as to permit only a selected portion of the text matter on a frame of said first disc to be projected, said discs each having uniform peripheral teeth of the same angular spacing as said frames of text on said first disc, and the angular spacing of said transparent windows in said other disc being progressively and uniformly varied step by step with relation to the angular spacing of the peripheral teeth and the frames of text so that as said other disc is rotated step by step, while a frame of text matter on said first disc is held motionless in position for projection, successive lines of text will be projected on a viewing screen, means for feeding said other disc step by step with respect to said first disc, and means for feeding said first disc step by step intermittently of the continuity of the step by step feeding of said other disc and simultaneously with a feeding step thereof, said means comprising independently pivoted pawls for engaging the peripheral teeth of said discs, eccentric means for reciprocating said pawls in unison through driving and return strokes, means for biasing said pawls in engagement with the teeth on their respective discs, and cam means rotating with said other disc and engaging the feeding pawl of said first disc, and said cam being arranged to prevent the engagement of the feeding pawl of said first disc with the peripheral teeth thereof except intermittently at selected multiples of feeding steps of said other disc.

2. In a reading training projector, lamp and lens means, a pair of film elements, guide means for presenting said film elements in overlapping relationship for simultaneous projection by said lamp and lens means, film feeding mechanism comprising independently pivoted film feeding members for engaging said film elements, means for reciprocating said feeding members through feeding and return strokes, means biasing said feeding members in a direction to engage said film elements during their feeding strokes to effect their step by step feeding as said feeding members are reciprocated, and cam means extending along one of said film elements and engaging the feeding member of said other film element to prevent its feeding engagement with said other film element, and said cam means having spaced interruptions therealong which permit the feeding of said other film element intermittently of the continuity of stepped feeding of said first-mentioned film element.

3. In a visual training projector, lamp and lens means, a mounting shaft, a pair of rigid, circular discs centrally pivoted side by side for rotation on said shaft, said discs each having a continuous series of peripheral teeth, one of said discs having an annularly arranged series of frames of photographic matter thereon arranged to be successively positioned for projection by said lamp and lens means as said disc is rotated, said other disc having annularly arranged transparent and opaque areas overlaying said series of frames on said first-mentioned disc, means to rotate one of said discs intermittently tooth by tooth, and means to rotate the other of said discs tooth by tooth intermittently of the continuity of the tooth by tooth rotation of said first-mentioned disc, said means including an independently pivoted tooth-engaging pawl for each of said discs, eccentric means for reciprocating said pawls in unison, means normally biasing said pawls in engagement with their respective teeth, and an annular surface on one of said discs engaging the pawl of said other disc to prevent its engagement with the teeth of said other disc, and said annular surface having spaced interruptions therealong which intermittently permit engagement of one tooth of said other disc by its respective pawl simultaneously with the engagement of a tooth on said first-mentioned disc by its respective pawl.

References Cited in the file of this patent

UNITED STATES PATENTS

| | | |
|---|---|---|
| 1,189,758 | Waller | July 4, 1916 |
| 1,219,933 | Gillespie | Mar. 20, 1917 |
| 1,761,361 | Oberg et al. | June 3, 1930 |
| 2,369,483 | Musebeck | Feb. 13, 1945 |
| 2,540,872 | Fleischer | Feb. 6, 1951 |
| 2,560,390 | Gruenhut | July 10, 1951 |

FOREIGN PATENTS

| | | |
|---|---|---|
| 175,092 | Great Britain | Feb. 16, 1922 |